Sept. 15, 1925.

G. S. EBLE 1,553,372

VALVE

Filed July 19, 1923    2 Sheets-Sheet 1

INVENTOR
GROVER S. EBLE
ATTORNEYS

Sept. 15, 1925.
G. S. EBLE
1,553,372
VALVE
Filed July 19, 1923   2 Sheets-Sheet 2
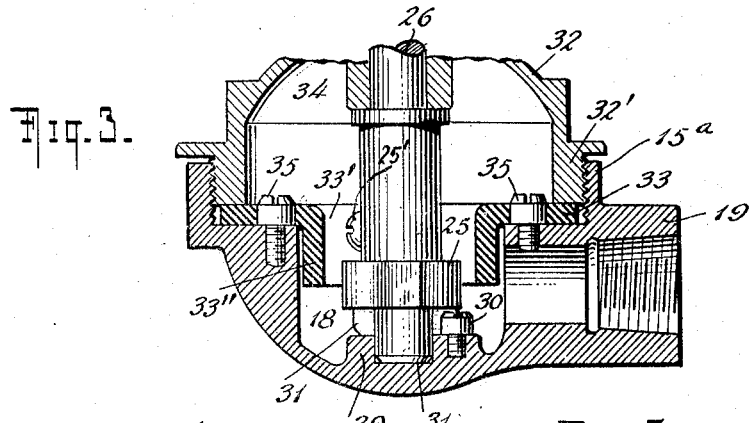
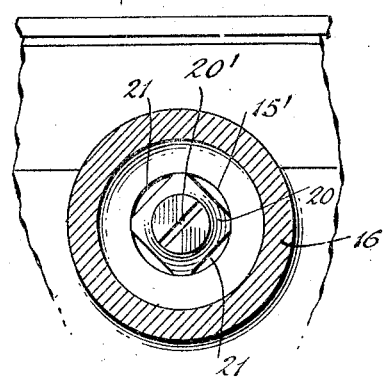
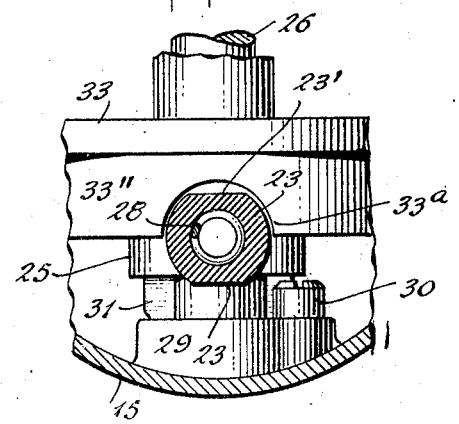
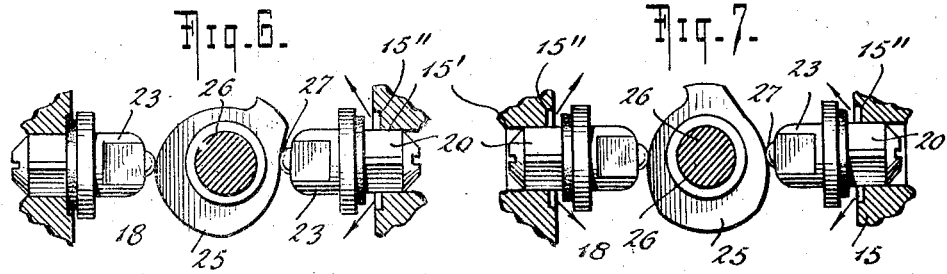
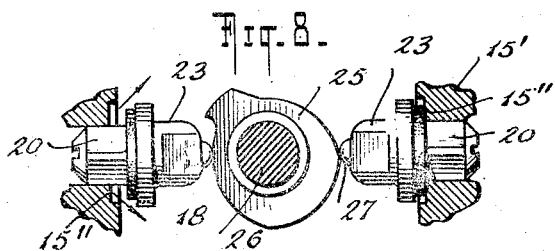
INVENTOR
GROVER S. EBLE
BY
ATTORNEYS Patented Sept. 15, 1925.

1,553,372

UNITED STATES PATENT OFFICE.

GROVER S. EBLE, OF NEW YORK, N. Y.

VALVE.

Application filed July 19, 1923. Serial No. 652,476.

*To all whom it may concern:*

Be it known that I, GROVER S. EBLE, a citizen of the United States, and resident of the borough of Manhattan, city, county, and State of New York, have invented certain new and useful Improvements in Valves, of which the following is a specification.

My invention relates to valves controlling the passage of fluids, and particularly to mixing valves of the type allowing one or the other of two fluids (for instance hot and cold water) to be discharged, or a mixture of both in varying proportions. The object of my invention is to provide a simple construction of this character which will be readily assembled and taken apart, in which the joints will remain tight, and in which the moving valve members will be held securely in their proper positions.

Figure 1:
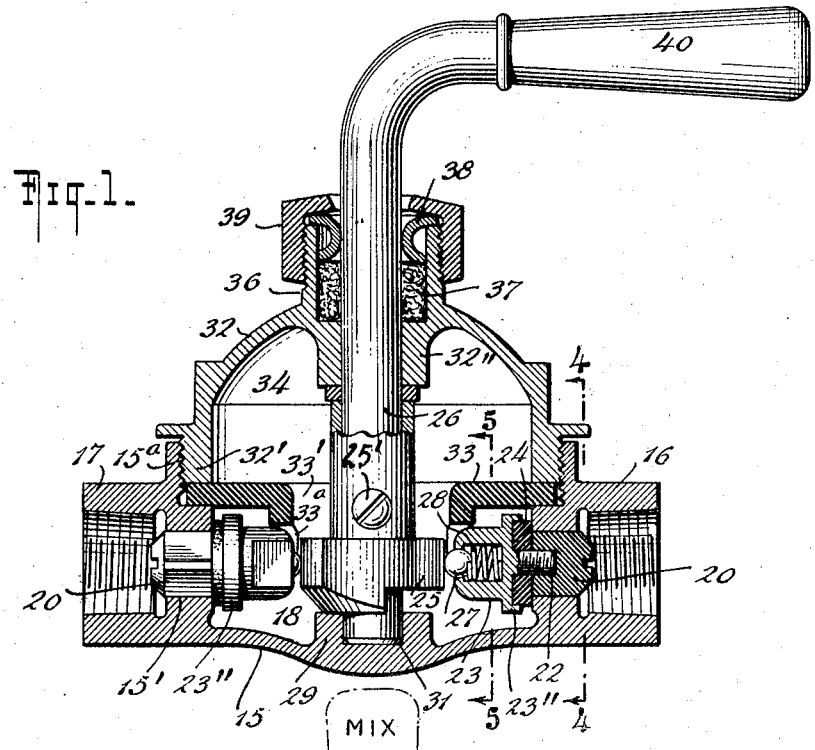
Figure 2:
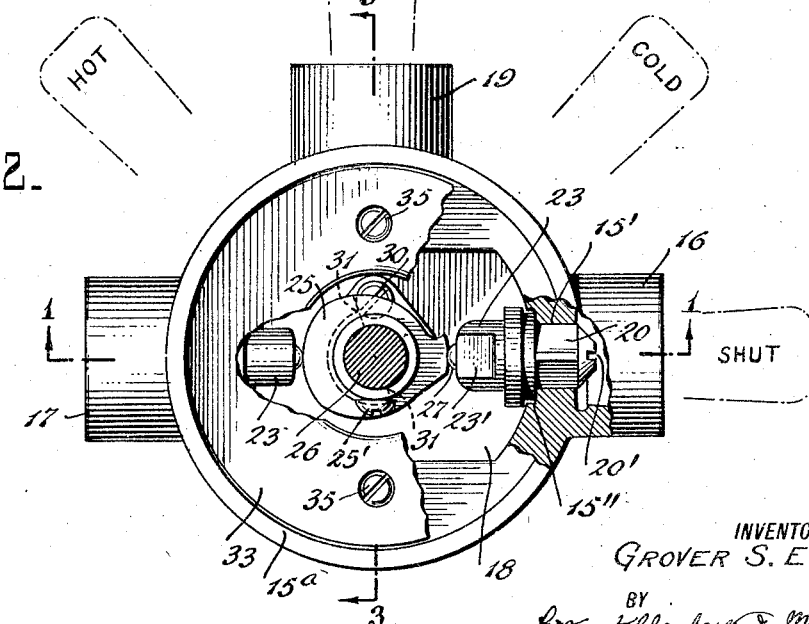

A typical example of a structure embodying my present invention is illustrated by the accompanying drawings, in which Fig. 1 is a central vertical section on line 1—1 of Fig. 2, the latter being a plan view, with parts in section; Fig. 3 is a partial vertical section on line 3—3 of Fig. 2; Figs. 4 and 5 are vertical sections on lines 4—4 and 5—5 respectively of Fig. 1; Figs. 1 to 5 show the closed or shut position of the valve; Fig. 6 is a diagrammatic sectional plan illustrating the position of the valves proper and of the cam controlling them, at a time when only one of them (the cold water valve) is open; Fig. 7 is a similar diagram showing the parts in the mixing position (both valves open); and Fig. 8 is a like diagram illustrating said parts in the position with only the other valve (the hot water valve) open.

The valve casing comprises a lower member and an upper member (the terms "upper" and "lower" being used for the sake of convenience, and not as implying that the parts are operative only in this position). The lower member, 15, has three connections or bosses, preferably screw threaded to receive the usual piping (not shown), two of these bosses, 16 and 17, which are represented as diametrically opposite, serving as inlets for the fluid (cold and hot water respectively) to a central chamber 18, while the third, 19, serves as an outlet for the fluid from said chamber. This outlet is shown as in permanent communication with the chamber 18, but the connection of the inlets 16 and 17 with said chamber is controlled by valves constructed as follows, in the specific example illustrated: Each of these valves comprises a guide member or stem 20 of substantially square or other suitable cross section (see especially Fig. 4) fitted to slide radially in the casing member 15, in a cylindrical guideway 15'. Passages 21 are thus provided through which the water may flow along the stem 20 when the valve is open. At one end, the stem has a screw threaded recess to receive a threaded shank or pin 22 projecting from an inner member 23, located in the chamber 18 and having a recess in which is seated the washer 24, of rubber or other suitable material, which is held compressed between the stem 20 and the inner member 23. To facilitate screwing together the parts 20, 23, I may provide flat surfaces 23' on the member 23, and a slot 20' (for the insertion of a screw-driver) on the stem 20. The washer 24 forms the sealing member or valve proper, adapted to become seated outwardly on the member 15 at the inner end of the guideway 15', a finished surface 15" being preferably provided to properly seat the washer.

It will be noted that the pressure of the water entering the bosses 16, 17 and the channels or passages 21 tends to open the two inlet valves. To close these valves, and to control their opening movement, I have provided a cam 25, secured to a spindle 26 rotatable about the axis of the casing member 15. The configuration or outline of this cam is such as to secure the operation set forth hereinafter. The cam is in engagement with balls 27 projecting inwardly from longitudinal recesses provided in the members 23, said recesses also containing springs 28 tending to project said balls, these springs also operating to transmit the pressure of the cam to the washers 24 to hold the latter in the seated position (Figs. 1 and 2). The springs should, of course, be of proper strength to resist the pressure of the water which tends to open the valves. The main purpose of employing these springs is to compensate for any inaccuracies in the construction or machining of the valves and the parts cooperating therewith; with the use of these springs, the dimensions of the parts may vary within a relatively wide tolerance range, and yet the valves will seat and operate properly.

The spindle 26 has its lower end journaled in a step bearing 29 which may be integral with the lower casing member 15. To this bearing is also secured a pin or screw 30 (Figs. 2, 3 and 5) constituting a stop to limit the movement of the cam 25 in either direction, said pin 30 cooperating with two stop shoulders 31 arranged on the underside of the cam 25, the two shoulders 31 being in diametral alignment, in the example illustrated.

The device further comprises an upper casing or bonnet 32, having a cylindrical threaded portion 32' screwed to a corresponding portion 15a of the lower member 15. The lower edge of the upper member 32 engages and compresses an annular member or washer 33, the central opening 33' of which is preferably of sufficient size to allow the cam 25 to pass therethrough freely, thereby facilitating the assembly and taking apart of the device. Through said opening 33', the chamber 18 is in permanent communication with the interior or chamber 34 of the upper member 32, the latter chamber thus virtually forming an extension of the chamber 18. A cylindrical flange 33'' extends downwardly into the chamber 18, from the washer 33, around the opening 33', and said flange is provided with arched cut-out portion 33a (Figs. 1 and 5) at diametrally opposite points, these portions straddling the inner members 23 of the inlet valves. The portions 33a may thus form additional guides for the inlet valves; their main function, however, is to prevent the valves from dropping out when the upper casing member 32 and the cam 25 are removed. For this purpose, the members 23 of said inlet valves are made with flanges 23'' of such a dimension that any excessive inward movement of the valves (after removal of the cam 25) will bring such flanges 23'' into engagement with the flange 33'', at the cut-out portion 33a, before the stem 20 comes out of engagement with the guide 15'. Fig. 5 shows the arc of the cut-out portion 33a as centered on the axis of the inlet valve, and it will be evident from Fig. 1 that the radius of said arc is smaller than that of the flange 23''. Of course, I do not restrict myself to this specific construction, the important feature being the provision of cooperating stop elements on the washer 33 and on the valves to prevent the valves from leaving the guides 15'. The washer 33 is held in proper position (even after removal of the upper member 32, or before such member is applied), in any suitable manner, preferably by two screws 35 arranged in a diameter in line with the outlet 19 (see Figs. 2 and 3).

The cam spindle 26 is also journaled in a bearing 32'' formed on the upper casing member 32. The spindle also extends through a stuffing box 36 containing packing 37 and a gland 38. A nut 39 holds these parts in position. The outer end of the spindle 26 terminates in a handle 40.

The mere loosening of the nut 39 will not enable a person to remove the handle 40 or the spindle 26, or in fact anything but the packing 37, which is of little value. Theft of valuable parts of the device is therefore practically impossible, since the appliance can be dismembered only by taking off the bonnet 32, which however can be unscrewed only with the aid of a special wrench of such large opening that the average sneak thief is not likely to have it available.

The operation is as follows:

In the Shut position (which may be indicated by the position of the handle relatively to a suitable stationary dial, as suggested in Fig. 2), the cam 25 stands in such a position (Figs. 1 and 2) as to close both valves controlling the inlets 16 and 17. By then turning the spindle 26 in a contra-clockwise direction (so as to bring the shoulder 31 shown at the top in Fig. 2, away from the stop 30 which it engages in said Shut position), the cold water inlet valve is caused to first open alone under the influence of the water pressure, this position, illustrated by Fig. 6, corresponding to the position of the handle 40 in registry with the legend Cold in Fig. 2. The hot water inlet valve shown at the left remains closed. By turning the spindle 26 farther in the same direction (say, to bring the handle 40 into registry with the word Mix, Fig. 2), the cam 25 is brought to a position (Fig. 7) in which both valves are allowed to open under the water pressure, so that both hot and cold water will enter the chambers 18 and 34 and will be discharged through the outlet 19. Finally, by swinging the handle 40 contra-clockwise until the other shoulder 31 engages the stop 30, the cam 25 will be brought into a position (Fig. 3) in which it will close the cold water inlet valve while leaving the hot water inlet valve open, so that at this time (handle 40 registering with the word Hot) only hot water will flow from the outlet 19.

It will be understood that after the balls 27 have been placed within the recesses of the members 23, the mouths of said recesses are crimped or otherwise contracted to a size smaller than the diameter of said balls.

It will be noted that the cam 25 is secured (by a set screw 25') in such a manner that it can be adjusted readily in a circumferential direction, relatively to the spindle 26. This enables me not only to effect an accurate positioning of the cam relatively to the handle 40, so that the cam will be in the proper position when the handle points to Shut, Cold, etc.; but a further advantage of this construction is that the cam may be given an entirely different position, at 180° from the one illustrated. When the cam is brought to this new position (and, of course, locked again to the spindle) the inlet 17 will become the cold-water inlet and the inlet 16, the hot-water inlet. The position of the handle 40 and of the dial on which it indicates, will not be disturbed, and the manner of operating the device will be exactly the same as before. This is of especial advantage as it enables one to supply hot water either from the left or the right, thus simplifying the piping and in certain relations, avoiding the crossing of the cold-water pipes with the hot-water pipes, for instance, when such pipes are connected with two or more devices.

Various modifications may be made without departing from the nature of my invention as set forth in the appended claims.

I claim:

1. A device of the class described, comprising a casing composed of two members one of which is formed with a chamber having two inlets and an outlet, a cam mounted to turn in said chamber, valves controlling said inlets and movable radially with respect to the cam axis, and governed by said cam, a handle, journaled in the other casing member, for actuating said cam, and a washer compressed between the two casing members to form a tight joint between them, said washer and said valves being provided with cooperating stop elements to prevent separation of the valves from the casing member having the inlets, when the valve-controlling cam is withdrawn.

2. A device of the class described, comprising a casing formed with a chamber having two inlets and an outlet, said casing being composed of two members, a cam mounted to turn in said chamber, valves controlling said inlets and movable toward and from the axis of the cam, and governed by said cam, a handle, journaled in one of casing members, for actuating said cam, and a washer compressed between said casing members to form a tight joint between them, said washer and said valves being provided with cooperating stop elements to prevent separation of the valves when the valve-controlling cam is withdrawn.

3. A device of the class described, comprising a casing formed with a chamber having an inlet and an outlet, said casing being composed of two members, a cam mounted to turn in said chamber, a valve controlling said inlet and movable toward and from the axis of the cam, and governed by said cam, a handle, journaled in said casing, for actuating said cam, and a washer compressed between said casing members to form a tight joint between them, said washer and said valve being provided with cooperating stop elements to prevent separation of the valve when said cam is withdrawn.

4. A device of the class described, comprising a casing formed with a chamber having two inlets and an outlet, said casing being composed of two members, a cam mounted to turn in said chamber, valves controlling said inlets and movable on one of said members toward and from the axis of the cam, and governed by said cam, a handle, journaled in the other casing member, for actuating said cam, and a washer compressed between said casing members to form a tight joint between them, said washer having a central opening through which extends the connection from said handle to said cam, and also having a flange extending toward the valves, each of the latter having a projection adapted to engage said flange before the valve can become separated from the casing, whereby the valves will be held connected with the casing when the cam is withdrawn.

5. A device of the class described, comprising a casing formed with a chamber having two inlets and an outlet, a cam mounted to turn in said chamber, valves controlling said inlets and movable toward and from the axis of the cam, said valves being formed with longitudinal recesses, balls located within said recesses and projecting therefrom for engagement with said cam, and springs contained in said recesses and tending to force said balls toward the cam.

6. A device of the class described, comprising a casing formed with a chamber having two inlets and an outlet, valves controlling said inlets, a spindle mounted to turn in said casing, and a valve-controlling cam secured to said spindle to normally turn in unison therewith, but adjustable circumferentially in relation to the spindle to two different positions in which the functions of the cam portions controlling said two valves are interchanged.

7. A device of the class described, comprising a casing formed with a chamber having two inlets and an outlet, valves controlling said inlets, a spindle mounted to turn in said casing, and a valve-controlling cam secured to said spindle to normally turn in unison therewith, but adjustable circumferentially in relation to the spindle.

In testimony whereof I have signed this specification.

GROVER S. EBLE.